United States Patent
Nagata et al.

(10) Patent No.: US 10,775,195 B2
(45) Date of Patent: Sep. 15, 2020

(54) ROTATION ANGLE SENSING DEVICE

(71) Applicant: TDK Corporation, Tokyo (JP)

(72) Inventors: Masaki Nagata, Tokyo (JP); Hiraku Hirabayashi, Tokyo (JP); Yohei Hirota, Tokyo (JP)

(73) Assignee: TDK Corporation, Tokyo (JP)

(*) Notice: Subject to any disclaimer, the term of this patent is extended or adjusted under 35 U.S.C. 154(b) by 341 days.

(21) Appl. No.: 15/448,984

(22) Filed: Mar. 3, 2017

(65) Prior Publication Data

US 2017/0261342 A1 Sep. 14, 2017

(30) Foreign Application Priority Data

Mar. 11, 2016 (JP) .................................. 2016-48621

(51) Int. Cl.
*G01D 5/14* (2006.01)
*G01B 7/30* (2006.01)
(Continued)

(52) U.S. Cl.
CPC .............. *G01D 5/145* (2013.01); *G01B 7/30* (2013.01); *G01D 5/16* (2013.01); *G01D 5/165* (2013.01)

(58) Field of Classification Search
CPC ........ G01B 7/30; G01R 33/07; G01R 33/072; G01R 33/075; G01R 33/09; G01R 33/091;
(Continued)

(56) References Cited

U.S. PATENT DOCUMENTS

2003/0094941 A1* 5/2003 Mizutani ................ G01D 5/145
324/207.2
2010/0315074 A1* 12/2010 Abe ....................... G01D 5/145
324/207.25
(Continued)

FOREIGN PATENT DOCUMENTS

JP  2003-075108 A  3/2003
JP  2005-291942 A  10/2005
(Continued)

OTHER PUBLICATIONS

Office Action dated Dec. 19, 2017 issued in corresponding JP patent application No. 2016-048621 (and English machine translation attached).

*Primary Examiner* — David M Schindler
(74) *Attorney, Agent, or Firm* — Posz Law Group, PLC

(57) ABSTRACT

A rotation angle sensing device is provided with a magnet that is placed to be integrally rotatable with a rotary shaft of a rotating body in association with a rotating body, where the shape of the magnet as viewed along the rotary shaft is substantially circular; a magnetic sensor part that outputs a sensor signal based upon a change in a direction of a magnetic field in association with the rotation of the magnet; and a rotation angle detecting part that detects a rotation angle of the rotating body based upon the sensor signal output by the magnetic sensor part. The magnet has a component of a magnetization vector in a direction that is orthogonal to the rotation axis. When a circular virtual plane that is orthogonal to the rotary shaft centering upon the rotary shaft is set in the vicinity of the magnet, the magnetic sensor part is placed at a position where the amplitudes of the magnetic field intensity $H_r$ in the radial direction and the magnetic field intensity Ho in the circumferential direction on the virtual plane are substantially the same, and the magnetic field intensity $H_r$ in the radial direction and/or the (Continued)

magnetic field intensity Ho in the circumferential direction are/is output as the sensor signal.

6 Claims, 13 Drawing Sheets

(51) Int. Cl.
*G01D 5/16* (2006.01)
*G01D 5/165* (2006.01)

(58) Field of Classification Search
CPC .. G01R 33/093; G01R 33/096; G01R 33/098; G01D 5/16; G01D 5/142; G01D 5/145; G01D 5/147; G01D 5/165; G01D 5/245; G01D 5/2451; G01D 5/2454; G01D 5/249

See application file for complete search history.

(56) References Cited

U.S. PATENT DOCUMENTS

| | | | |
|---|---|---|---|
| 2012/0038359 A1* | 2/2012 | Saruki | B82Y 25/00 324/252 |
| 2015/0198464 A1* | 7/2015 | El Alami | G01B 7/30 324/207.25 |
| 2017/0234699 A1* | 8/2017 | Ausserlechner | G01D 5/145 324/207.2 |

FOREIGN PATENT DOCUMENTS

| | | |
|---|---|---|
| JP | 2007-40850 A | 2/2007 |
| JP | 2010-066196 A | 3/2010 |
| WO | 2008/050581 A1 | 5/2008 |

\* cited by examiner

ROTATION ANGLE SENSING DEVICE

CROSS REFERENCE TO RELATED APPLICATION

The present application is based on and claims the benefit of priority of Japanese Patent Application No. 2016-48621, filed on Mar. 11, 2016, the disclosure of which is incorporated herein by reference.

TECHNICAL FIELD

The present invention relates to a rotation angle sensing device for detecting a rotation angle of a rotating body.

BACKGROUND

Conventionally, a rotation angle sensing device for detecting a rotation angle of a rotating body is used for various purposes. One such rotation angle sensing device is provided with a magnet, which is fixed to rotate with a rotating body, and a magnetic sensor element for detecting a change in intensity of a magnetic field in association with the rotation of the magnet. In such rotation angle sensing device, the magnetic sensor element outputs a signal indicating a relative positional relationship between the rotating body and the magnetic sensor element.

A known conventional rotation angle sensing device, as shown in FIG. 23A and FIG. 23B, includes a magnet 200 that is disk-like and is supported by and fixed to a shaft S (rotary shaft) to allow a first surface 201 and a second surface 202 of the magnet 200 to be orthogonal to the shaft S (rotary shaft). A magnetic sensor element (Hall element) 300 is arranged immediately beneath an outer circumference of the second surface 202 of the magnet 200 and in a circumferential direction about the shaft S (rotary shaft) (see Patent Literature 1).

In the rotation angle sensing device, because shaft wobble occurs and causes the shaft S (rotary shaft) to minutely move, the magnet 200 supported by and fixed to the shaft S (rotary shaft) minutely moves in the radial direction. In the meantime, the magnetic sensor elements (Hall elements) 300 are arranged to measure magnetic flux density in a direction parallel to the shaft S (rotary shaft) at a corner portion of the outer circumference of the magnet 200. Consequently, a measured value for the magnetic flux density that is measured by the magnetic sensor elements (Hall elements) 300 varies greatly in association with the minute movement of the magnet 200, and an error in measurement of a rotation angle is accentuated.

Conventionally, as shown in FIG. 24A and FIG. 24B, a rotation angle sensing device that is provided with a magnet 210, which is supported by and fixed to the shaft S (rotary shaft), a first surface 211 and a second surface 212 opposed the first surface 211, and magnetic sensor elements (Hall elements) 310 arranged immediately beneath an outer circumference of the magnet 210. The magnet 210 has a chamfering part 213 (inclined surface) formed by eliminating corners of the outer circumference at the second surface 212 side. A portion of a detector plane in the magnetic sensor elements (Hall elements) 310 is positioned immediately beneath the chamfering part 213 (inclined surface) and a remainder is arranged to be positioned outside the outer circumference of the magnet 210 (see Patent Literature 2).

PRIOR ART LITERATURE

Patent Literature

[Patent Literature 1] JP Laid-Open Patent Application No. 2003-75108
[Patent Literature 2] International Publication No. 2008/050581

SUMMARY OF THE INVENTION

Problem to be Solved by the Invention

However, in the rotation angle sensing device described in Patent Literature 2 above, because the magnetic sensor elements 310 are configured to detect a magnetic field in a rotary shaft direction generated from the magnet 210, the arrangement locations of the magnetic sensor elements 310, which are optimum to minimize a detection error of the rotation angle, happen to fluctuate due to the inclination angle of the chamfering part 213 (inclined surface) of the magnet 210. Consequently, there is a problem that the arrangement locations of the magnetic sensor elements 310 have to be fine-tuned according to the inclination angle of the chamfering part 213 (inclined surface) of the magnet 210. In other words, unless the chamfering part 213 (inclined surface) of the magnet 210 is formed at a highly accurate inclination angle, and the magnetic sensor elements 310 are precisely arranged at appropriate positions, a detection error of the rotation angle becomes accentuated.

Further, in general, in order to reduce the size of the rotation angle sensing device, it is required to reduce the volume of the magnet; in the meantime, it is required to generate a magnetic field with an intensity that enables measurement of a change in the magnetic flux density by the magnetic sensor elements, from the magnet. In Patent Literature 2 above, since the chamfering part 213 (inclined surface) is formed at the outer circumference of the magnet 210, even though the volume can be reduced compared to the magnet where the chamfering part 213 (inclined surface) is not formed, the magnetic field (magnetic field in a direction of the rotary shaft) that is generated toward the chamfering part 213 (inclined surface) from the magnet 210 becomes weaker. However, since the magnet 210 has to generate the magnetic field with an intensity that is strong enough to enable the magnetic sensor elements 310 to measure a change in the magnetic flux density, it becomes difficult to simultaneously fulfill the demand to increase the intensity of the magnetic field and the demand to reduce the volume of the magnet, which conflict with each other. If the volume of the magnet is increased for the purpose of increasing the intensity of the magnetic field and the mass of the magnet 210 becomes relatively greater due to the volume increase, a moment of inertia in association with the rotation of the shaft S (rotary shaft) increases. As a result, it becomes difficult to control the shaft deviation, and it may cause an increase of the detection error of the rotation angle. In addition, because it is necessary to ensure the mass of the magnet 210 to some degree, there is also a problem in that the manufacturing cost of the rotation angle sensing device is increased.

In the rotation angle sensing device described in Patent Literature 2 above, the rotation angle is calculated using the intensity of the magnetic field (a magnetic field in a direction of a rotary shaft C) that is generated toward the chamfering part 213 (inclined surface) side of the magnet 210. Then, when the magnetic sensor elements 310 are arranged in a very narrow region opposed to the chamfering part 213 (inclined surface) of the magnet 210, the detecting error of the rotation angle becomes smaller. In addition, the relative position to the magnet 210 in the region happens to fluctuate according to the inclination angle of the chamfering part 213 (inclined surface). Consequently, in order to precisely detect the rotation angle by the rotation angle sensing device described in Patent Literature 2, the magnetic sensor elements 310 have to be precisely arranged in the region to fluctuate according to the inclination angle of the chamfering part 213 (inclined surface). Therefore, a detection error of the rotation angles increases due to the shaft deviation.

In view of the problem above, the present invention provides a rotation angle sensing device enabling accurate detection of a rotation angle based upon magnetic fields intensity in a radial direction and/or in a circumferential direction.

Means for Solving the Problem

In order to solve the problem above, the present invention provides a rotation angle sensing device that is provided with:

a magnet that is placed to be integrally rotatable with a rotary shaft of a rotating body in association with a rotation of the rotating body, and where its shape as viewed along the rotary shaft is substantially circular;

a magnetic sensor part that outputs a sensor signal based upon a change in a direction of a magnetic field in association with the rotation of the magnet; and a rotation angle detecting part that detects a rotation angle of the rotating body based upon the sensor signal output by the magnetic sensor part, wherein the magnet has a magnetization vector component in a direction that is orthogonal to the rotary shaft; and when a circular virtual plane that is orthogonal to the rotary shaft centered upon the rotary shaft is set in the vicinity of the magnet, the magnetic sensor part is placed at a position where amplitudes of a magnetic field intensity $H_r$ in the radial direction and a magnetic field intensity $H_\theta$ in the circumferential direction on the virtual plane are substantially the same, and a least one of the magnetic field intensity $H_r$ in the radial direction and the magnetic field intensity $H_\theta$ in the circumferential direction is output as the sensor signal (Invention 1).

In the invention above (Invention 1), it is preferable that the magnet has a first surface that is substantially orthogonal to the rotary shaft and a second surface that opposes the first surface. A size of the second surface is such that the second surface physically includes the first surface when viewed along the axial direction of the rotary shaft. The magnetic sensor part is placed at a position that opposes the second surface of the magnet (Invention 2).

In the invention above (Invention 2), it is preferable that the magnetic sensor part is placed between a first line that is parallel to the rotary shaft and passes through an outer circumference part of the first surface and a second line that is parallel to the rotary shaft and passes through an outer circumference part of the second surface (Invention 3).

In the invention above (Invention 2), it is preferable that the magnet includes a base portion, which comprises the second surface, and a convex portion that has the first surface and that protrudes toward the first surface from the base portion (Invention 4).

In the invention above (Invention 4), it is preferable that the base portion comprises a side surface that continues to an outer circumference part of the second surface and that is substantially parallel to the rotary shaft (Invention 5); it is preferable that the convex portion protrudes toward the first surface side more at a radially inner location of the magnet than the side surface of the base portion (Invention 6); it is preferable that the convex portion protrudes toward the first surface side to incline internally in the radial direction of the magnet (Invention 7); and it is preferable that a volume ratio of the base portion to the convex portion is 1:0.2 or greater (Invention 8).

In the invention above (Invention 1), as the magnet sensor part, a TMR element, a GMR element, an AMR element or a Hall element is usable (Invention 9).

In the invention above (Invention 1), it is preferable that the rotation angle sensing device has a plurality of the magnetic sensor parts, and at least two of the plurality of the magnetic sensor parts are arranged substantially at intervals $(180/M)°$ (M is an integer greater than or equal to 2) centering on the rotary shaft along the circumferential direction on the virtual plane (Invention 10).

In the invention above (Invention 10), it is preferable that each of the magnetic sensor parts outputs the magnetic field intensity $H_r$ in the radial direction or the magnetic field intensity $H_\theta$ in the circumferential direction as the sensor signal (Invention 11).

Effect of the Invention

According to the present invention, a rotation angle sensing device can be provided that accurate detection of a rotation angle based upon magnetic fields intensity in a radial direction and/or a circumferential direction.

MODE FOR CARRYING OUT THE INVENTION

Figure 1A:
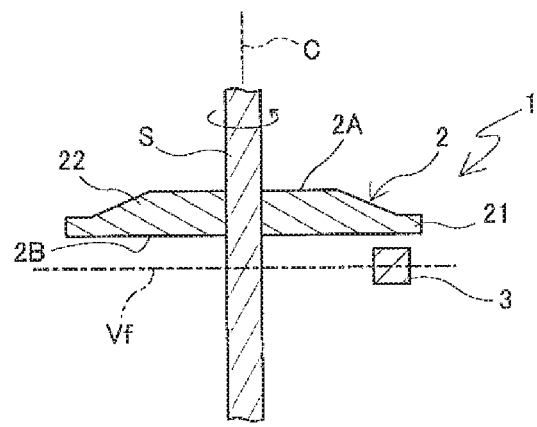
FIG. 1A is a cross-sectional view showing a schematic configuration of a rotation angle sensing device relating to the embodiment of the present invention.
Figure 1B:
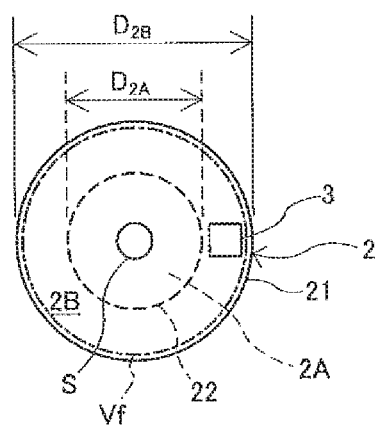
FIG. 1B is a plan view viewing from a second surface side of a magnet in the rotation angle sensing device relating to the embodiment of the present invention.
Figure 2:
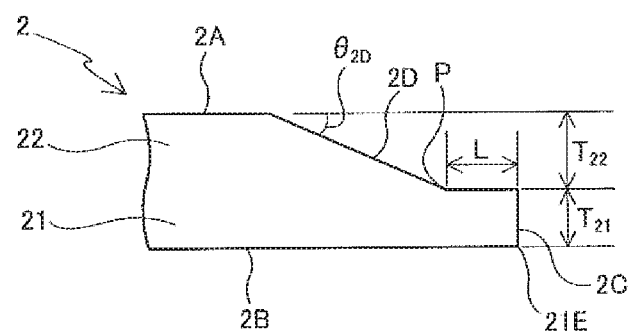
FIG. 2 is a partially-enlarged side view showing a primary part of the magnet in the embodiment of the present invention.

An embodiment of the present invention is explained in detail with reference to the drawings. FIG. 1A is a cross-sectional view showing a schematic configuration of a rotation angle sensing device relating to the present embodiment; FIG. 1B is a plan view as viewed from a second surface side of a magnet in the rotation angle sensing device relating to the present embodiment; and FIG. 2 is a partially-enlarged side view showing a primary part of the magnet in the present embodiment.

As shown in FIG. 1A and FIG. 1B, a rotation angle sensing device 1 relating to the present embodiment is supported and fixed to the shaft S, and is provided with a magnet 2 that integrally rotates with the shaft S, a magnetic sensor part 3 that outputs a sensor signal based upon a change in a direction of a magnetic field in association with a rotation of the magnet 2; and a rotation angle detecting part 4 (see FIG. 12) that detects a rotation angle of a rotating body based upon the sensor signal output by the magnetic sensor part 3.

The shaft S is made of a magnetic metal, such as Fe or Ni, and has a circular cylindrical shape. The shaft S rotates integrally with a rotation angle of a subject to be detected (not shown), such as a motor or gear.

The magnet 2 has a first surface 2A that is substantially orthogonal to the rotation axis C (shaft center) of the shaft S and a second surface 2B opposed to the first surface 2A. The first surface 2A and the second surface 2B are nearly circular when viewed along an axial direction of the rotation axis C of the shaft S. The second surface 2B is sized to physically include the first surface 2A.

The magnet 2 is supported and fixed/to the shaft S to match the centroid (center) of the first surface 2A and the second surface 2B of the magnet 2 with the rotation axis C of the shaft S. The magnet is magnetized in a direction that is orthogonal to the rotation axis C of the shaft S (in an in-plane direction of the first surface 2A and the second surface 2B). Furthermore, in the present embodiment, the magnet 2 magnetized in the direction that is orthogonal to the rotation axis C, but the present embodiment shall not be limited to such. For example, the magnet 2 should have a magnetization vector component in the direction that is orthogonal to the rotation axis C, and it is preferable that the magnetization direction of the magnet 2 is substantially orthogonal to the rotation axis C (an angle to the rotation axis C in the magnetization direction is approximately 90±10°).

The magnet 2 in the present embodiment has a base portion 21 having the second surface 2B and a convex portion 22 that has the first surface 2A and protrudes toward the first surface 2A side from the base portion 21. The base portion 21 continues to an outer circumference part 21E of the second surface 2B, and has a side surface 2C (see FIG. 2) that is substantially parallel to the rotation axis C of the shaft S. The convex portion 22 protrudes toward the first surface 2A side from a position P (see FIG. 2) internally in the radial direction of the magnet 2 from the side surface 2C of the base portion 21 and has an inclined side surface 2D that is inclined internally in the radial direction of the magnet 2 at a predetermined angle θ2D.

Thickness $T_{21}$ of the base portion 21 of the magnet 2 is not particularly limited, and for example, can be set to approximately 1 to 4 mm. Thickness $T_{22}$ of the convex portion 22 is also not particularly limited, and for example, can be set to approximately 1 to 4 mm.

It is preferable that a ratio of a diameter $D_{2A}$ of the first surface 2A to a diameter $D_{2B}$ of the second surface 2B in the magnet 2 is 1:2 or greater. If the ratio of the diameter $D_{2A}$ of the first surface 2A to the diameter $D_{2B}$ of the second surface 2B is within the range above, when a circular virtual plane Vf, which is orthogonal to the rotation axis C beneath the second surface 2B and is centered upon the rotation axis C is set, the amplitude of a magnetic field intensity $H_r$ in the radial direction and that of a magnetic field intensity $H_\theta$ in the circumferential direction at a predetermined position on the virtual plane Vf are substantially the same. Here, the virtual plane Vf is a plane optionally set within a predetermined space (a space in the vicinity of the second surface 2B) beneath the second surface 2B of the magnet 2. Furthermore, the diameter $D_{2A}$ of the first surface 2A can be set to, for example, approximately 8 mm to 20 mm, and the diameter $D_{2B}$ of the second surface 2B can be set to, for example, approximately 16 mm to 40 mm.

The Length L (length along the radial direction of the magnet 2) from the side surface 2C of the base portion 21 to a rising position of the inclined side surface 2D of the convex portion 22 (position P internally in the radial direction of the magnet 2) can be set to, for example, approximately 8 mm or less, and preferably approximately 1 mm to 4 mm.

In the magnet 2 of the present embodiment, a ratio of volume $V_{21}$ of the base portion 21 to volume V22 of the convex portion 22 ($V_{21}$:$V_{22}$) is preferably 1:0.2 or greater, is more preferably 1:0.2-5, and is particularly preferably 1:0.2-

1. If the volume ratio ($V_{21}:V_{22}$) is within the range above, a region where the amplitude of the magnetic field intensity $H_r$ in the radial direction and that of the magnetic field intensity $H_\theta$ in the circumferential direction become substantially identical.

Figure 3:
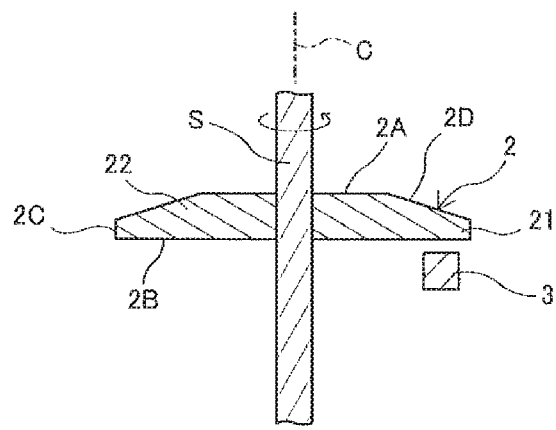
FIG. 3 is a cross-sectional view showing another mode (Part 1) of the magnet in the embodiment of the present invention.
Figure 4:
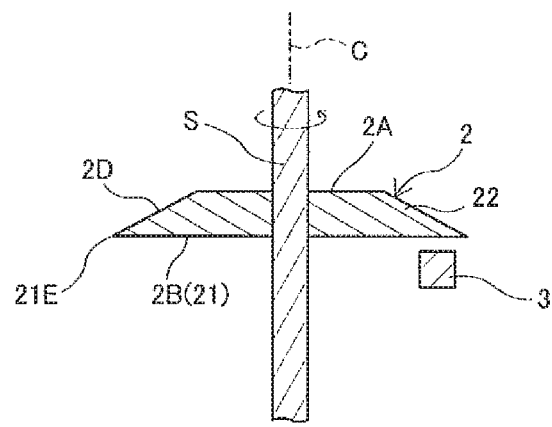
FIG. 4 is a cross-sectional view showing another mode (Part 2) of the magnet in the embodiment of the present invention.
Figure 5:
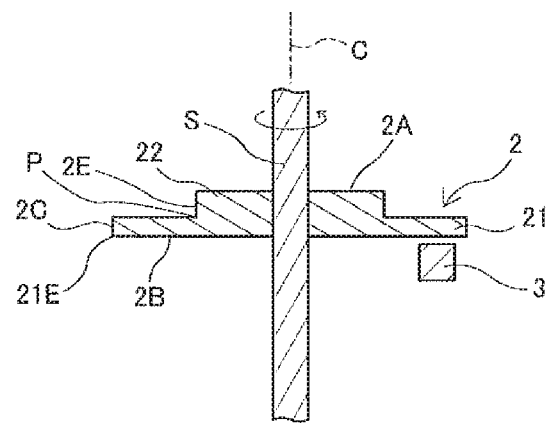
FIG. 5 is a cross-sectional view showing another mode (Part 3) of the magnet in the embodiment of the present invention.

Furthermore, the magnet 2 in the present embodiment is not limited to the modes shown in FIG. 1A and FIG. 2. For example, as shown in FIG. 3, a mode having the base portion 21, which includes the side surface 2C, continuing to the second surface 2B and the outer circumference part 21E of the second surface 2B and having the convex portion 22, which includes the inclined side surface 2D, continuing to the upper end of the side surface 2C and the first surface 2A is also acceptable. Further, as shown in FIG. 4, another mode with a nearly trapezoidal cross-sectional shape having the base portion 21, which includes the second surface 2B, and the convex portion 22, which includes the inclined side surface 2D continuing to the outer circumference part 21E of the second surface 2B, and the first surface 2A is also acceptable. In addition, as shown in FIG. 5, another mode with a nearly stepwise cross-sectional shape having the base portion 21, which includes the second surface 2B and the side surface 2C continuing to the outer circumference part 21E of the second surface 2B, and the convex portion 22, which includes the side surface 2E rising substantially in parallel to the rotation axis C of the shaft S from the position P more internally in the radial direction of the magnet 2 than the side surface 2C and the first surface 2A is also acceptable.

Figure 6A:
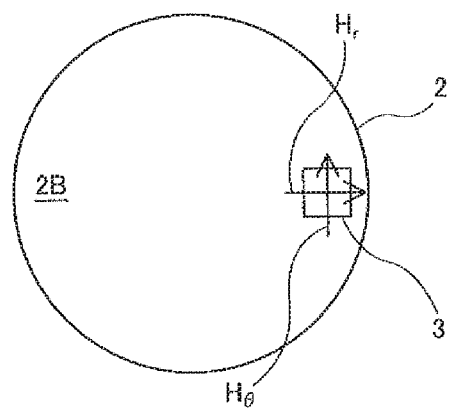
FIG. 6A is a schematic view showing magnetic field intensities (magnetic field intensities in a radial direction and in a circumferential direction) that are detected by a magnetic sensor part in the embodiment of the present invention.
Figure 6B:
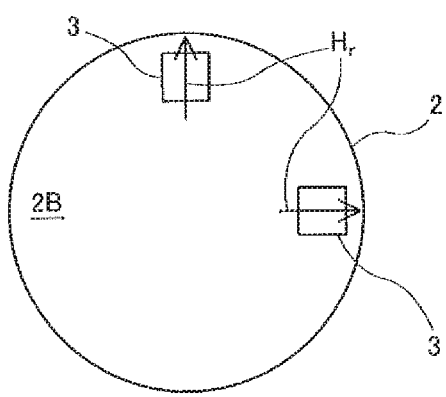
FIG. 6B is a schematic view showing another mode of magnetic field intensities (magnetic field intensities in a radial direction) that are detected by the magnetic sensor parts.
Figure 6C:
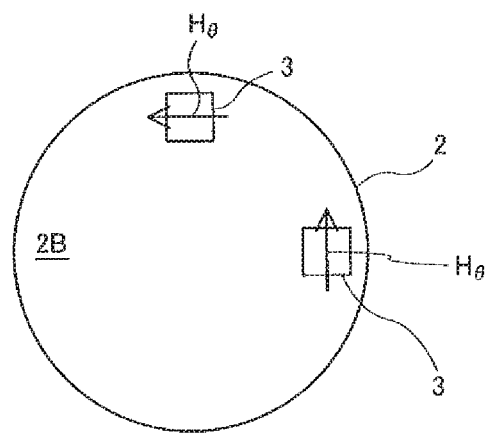
FIG. 6C is a schematic view showing another mode of magnetic field intensities (magnetic field intensities in a circumferential direction) that are detected by the magnetic sensor parts.

When the circular virtual plane Vf that is orthogonal to the rotation axis C beneath the second surface 2B of the magnet 2, and that is centered upon the rotation axis C is set, the magnetic sensor part 3 in the present embodiment is placed at a position where the amplitude of the magnetic field intensity $H_r$ in the radial direction and that of the magnetic field intensity Ho in the circumferential direction are substantially the same at a predetermined position on the virtual plane Vf. Furthermore, in the present embodiment, as shown in FIG. 6A, while one magnetic sensor part 3 that can detect the magnetic field intensity $H_r$ in the radial direction and the magnetic field intensity $H_\theta$ in the circumferential direction is exemplified, but the present embodiment shall not be so limited. For example, as shown in FIG. 6B and FIG. 6C, may be provided with two magnetic sensor parts 3 that are arranged at intervals of 90° about the rotation axis C of the shaft S. In this case, the two magnetic sensor parts 3 may detect the magnetic field intensity $H_r$ in the radial direction (see FIG. 6B) and may detect the magnetic field intensity $H_\theta$ in the circumferential direction, respectively (see FIG. 6C).

In the case of the provision of a plurality of the magnetic sensor parts 3, at least two of the plurality of the magnetic sensor parts 3 should be placed at intervals of substantially (180/M) ° (M is an integer greater than or equal to 2, and is preferably an integer of 2 to 5) about the rotation axis C of the shaft S. A signal that is output from the magnetic sensor parts 3 includes an $M^t$-order high-frequency error component, but since the $M^{th}$-order high-frequency error component can be removed by placing the magnetic sensor parts 3 at intervals of (180/M) ° about the rotation axis C, a detection error of the rotation angle can be further reduced.

Figure 7:
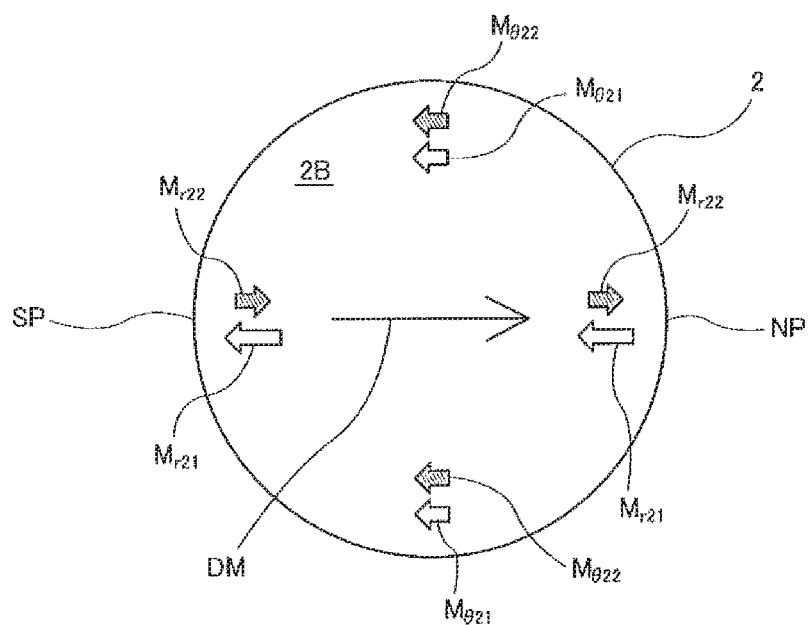
FIG. 7 conceptually shows magnetic field intensities in a radial direction and in a circumferential direction beneath the second surface of the magnet in the embodiment of the present invention.

In the present embodiment, the magnetic field intensity $H_r$ in the radial direction and the magnetic field intensity $H_\theta$ in the circumferential direction on the circular virtual plane Vf set beneath the second surface 2B of the magnet 2 can be handled as a sum of a magnetic field $M_{r21}$ in the radial direction that is generated by the base portion 21 of the magnet 2 and a magnetic field $M_{r22}$ in the radial direction that is generated by the convex portion 22 and a sum of a magnetic field $M_{\theta21}$ in the circumferential direction that is generated by the base portion 21 and a magnetic field $M_{\theta22}$ in the circumferential direction that is generated by the convex portion 22, respectively (see FIG. 7).

In the case the magnet 2 is magnetized in the in-plane direction of the magnet 2 as in the present embodiment, the magnitude of the magnetic field intensity $H_r$ in the radial direction on the virtual plane Vf becomes maximal in the vicinity of an N pole side edge NP and in the vicinity of an S pole side edge SP, respectively, and becomes minimal at a position rotated by 90° about the shaft 5 from the N pole side edge NP and the S pole side edge SP, respectively. In the meantime, the magnitude of the magnetic field intensity $H_\theta$ in the circumferential direction becomes maximal at a position rotated by 90° from the N pole side edge NP and the S pole side edge SP centering upon the shaft 5, respectively, and becomes minimal in the vicinity of the N pole side edge NP and the in the vicinity of the S pole side edge SP, respectively.

In the present embodiment, a direction of the magnetic field $M_{r21}$ in the radial direction that is generated by the base portion at the N pole side edge NP and the S pole side edge SP is anti-parallel to a magnetization direction DM of the magnet 2, respectively, and a direction of the magnetic field $M_{r22}$ in the radial direction that is generated by the convex portion 22 is parallel to the magnetization direction DM of the magnet 2. Then, the intensity of the magnetic field $M_{r21}$ (magnetic field intensity $H_{r21}$) in the radial direction that is generated by the base portion 21 is greater than that of the magnetic field $M_{r22}$ (magnetic field intensity $H_{r22}$) in the radial direction that is generated by convex portion 22 ($H_{r21} > H_{r22}$). Furthermore, in FIG. 7, the intensities of the magnetic field $M_{r21}$, $M_{r22}$, $M_{\theta21}$ and $M_{\theta22}$ (magnetic field intensities $H_{r21}$, $H_{r22}$. $H_{\theta21}$ and $H_{\theta22}$) are expressed with arrow length, respectively.

In the meantime, the direction of the magnetic field $M_{\theta21}$ in the circumferential direction that is generated by the based portion 21 and the direction of the magnetic field $M_{\theta22}$ in the circumferential direction at a position rotated by 90° about the shaft S from the N pole side edge NP and the S pole side edge SP are anti-parallel to the magnetization direction DM of the magnet 2, and the intensities of those magnetic fields $H_{\theta21}$ and $H_{\theta22}$ are smaller than the intensity of the magnetic field $M_{r21}$ (magnetic field intensity $H_{r21}$) in the radial direction that is generated by the base portion 21 at the N pole side edge NP and the S pole side edge SP ($H_{r21} > H_{\theta21}, H_{\theta22}$). Consequently, the amplitude of the magnetic field intensity $H_r$ in the radial direction and that of the magnetic field intensity $H_\theta$ in the circumferential direction become substantially the same.

Figure 8A:
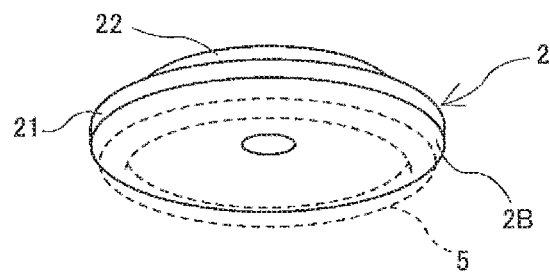
FIG. 8A is a perspective view schematically showing the magnet and a magnet sensor arrangeable region in the embodiment of the present invention.
Figure 8B:
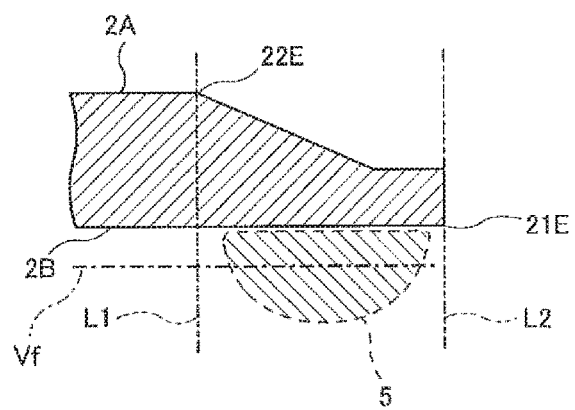
FIG. 8B is a side view of FIG. 8A.
Figure 9:
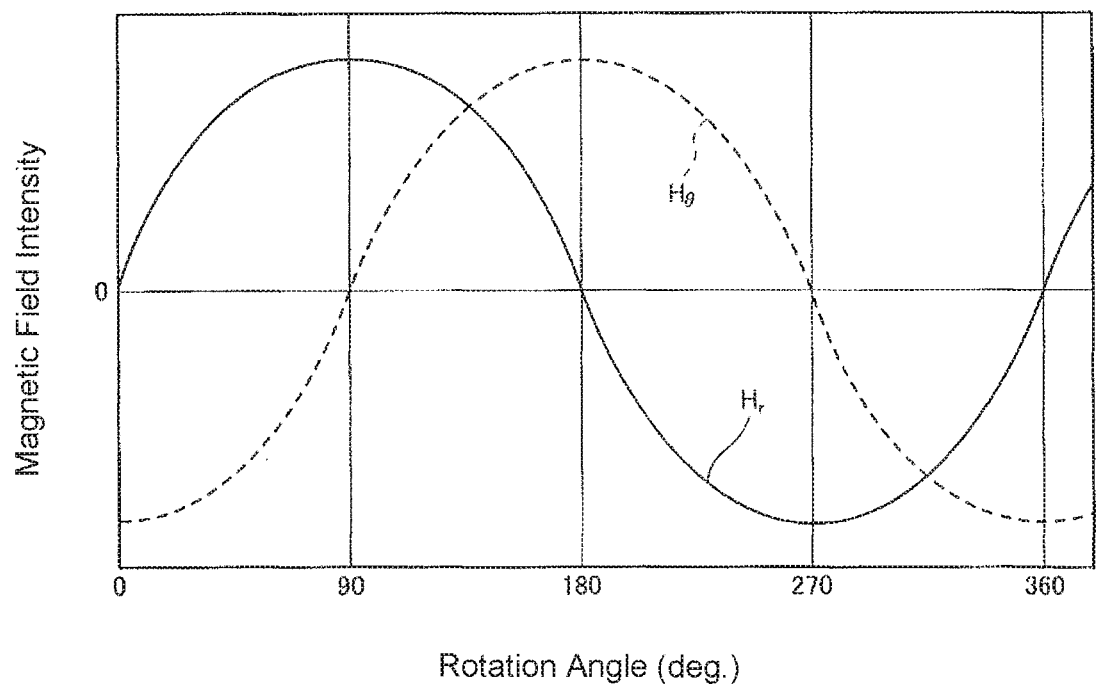
FIG. 9 is a graph showing amplitudes of magnetic field intensities that are detected in the rotation angle sensing device in the embodiment of the present invention.

As described above, a region where the amplitude of magnetic field intensities $H_r$ and $H_\theta$ in the radial direction and the circumferential direction on the virtual plane Vf set beneath the second surface 2B of the magnet 2 in the present embodiment are substantially identical (magnetic sensor arrangeable region 5) is created. This magnetic sensor arrangeable region 5, as shown in FIG. 8A and FIG. 8B, is a ring-shaped region beneath the second surface 2B between a first virtual line L1, which is parallel to the rotation axis C and passes through the outer circumference part 22E of the first surface 2A of the magnet 2, and a second virtual line L2, which is parallel to the rotation axis C and passes through the outer circumference part 21E of the second surface 2B. Therefore, since the amplitude of the magnetic field intensity $H_r$ in the radial direction and that of the magnetic field intensity $H_θ$ in the circumferential direction are substantially the same by placing the magnetic sensor part or parts 3 in this magnetic sensor arrangeable region 5 (see FIG. 9), a detection error of the rotation angle by the rotation angle sensing device 1 relating to the present embodiment can be reduced.

The magnetic sensor part 3 in the present embodiment includes at least one magnetic detecting element. The magnetic sensor part 3 may include a pair of magnetic detecting elements connected in series as at least one magnetic detecting element. In this case, the magnetic sensor part 3 has first and second detecting circuits including the first pair of magnetic detecting elements connected in series and the second pair of magnetic detecting elements connected in series.

Figure 10A:
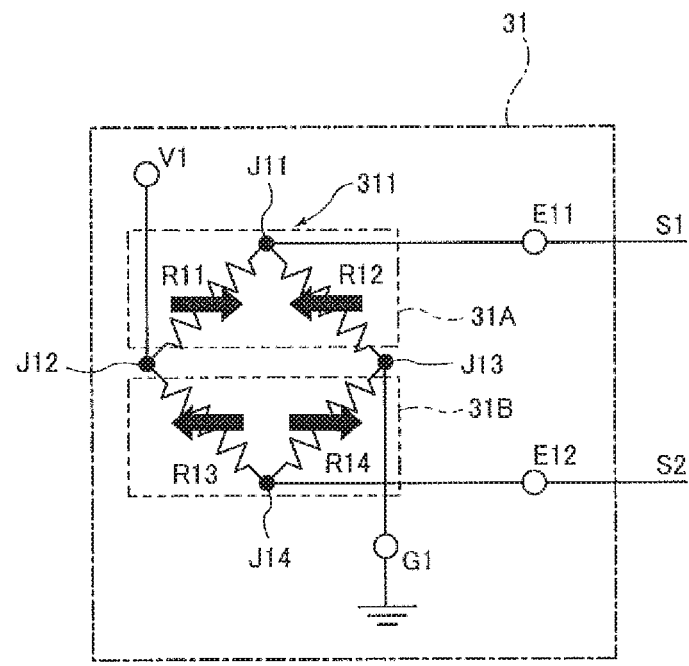
FIGS. 10A and 10B are a circuit diagram schematically showing one mode of a circuit configuration of the magnetic sensor part in the embodiment of the present invention, respectively.

As shown in FIG. 10A, the first detecting circuit 31 in the magnetic sensor part 3 has a power source port V1, a ground port G1, two output ports E11 and E12, and a first Wheatstone bridge circuit 311. The first Wheatstone bridge circuit 311 has a first signal generation part 31A including a first pair of magnetic detecting elements R11 and R12 connected in series and a second signal generation part 31B including a second pair of magnetic detecting elements R13 and R14 connected in series. A connecting point J12 of the magnetic detecting elements R11 and R13 is connected to the power source port V1. A connecting point J11 of the magnetic detecting elements R11 and R12 is connected to the output port E11. A connecting point J14 of the magnetic detecting elements R13 and R14 is connected to the output port E12. A connecting point J13 of the magnetic detecting elements R12 and R14 is connected to the ground port G1. Power-supply voltage with predetermined magnitude is applied to the power source port V1, and the ground port G1 is connected to the ground. A first signal S1 generated by the first signal generating part 31A is output from the output port E11, and a second signal S2 generated by the second signal generating part 31B is output from the output port E12.

Figure 10B:
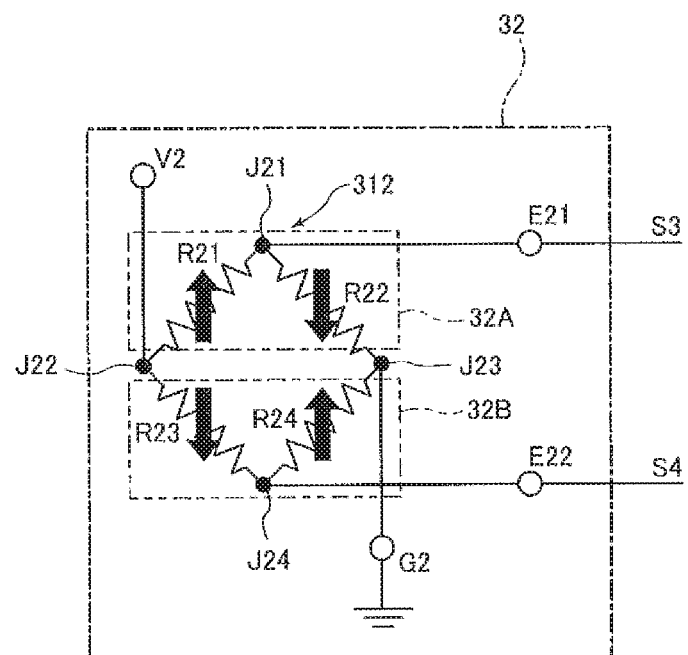

Further, as shown in FIG. 10B, the second detecting circuit 32 in the magnetic sensor part 3 has a power source port V2, a ground port G2, output ports E21 and E22 and a second Wheatstone bridge circuit 312. The second Wheatstone bridge circuit 312 has a third signal generation part 32A including a third pair of magnetic detecting elements R21 and R22 connected in series and a fourth signal generation part 32B including a fourth pair of magnetic detecting elements R23 and R24 connected in series. A connecting point J22 of the magnetic detecting elements R21 and R23 is connected to the power source port V2. A connecting point J21 of the magnetic detecting elements R21 and R22 is connected to the output port E21. A connecting point J24 of the magnetic detecting elements R23 and R24 is connected to the output port E22. A connecting point J23 of the magnetic detecting elements R22 and R24 is connected to the ground port G2. Power-supply voltage with predetermined magnitude is applied to the power source port V2, and the ground port G2 is connected to the ground. A third signal S3 generated by the third signal generating part 32A is output from the output port E21, and a fourth signal S4 generated by the fourth signal generating part 32B is output from the output port E22.

In the present embodiment, all magnetic detecting elements R11 to R14 and R21 to R24 included in the first and second detecting circuits 31 and 32 can be magnetoresistive effect elements (MR elements), such as a TMR element, a GMR element or an AMR element, a Hall element and the like. It is particularly preferable to use TMR elements. The TMR element and the GMR element have a magnetic fixed layer where the magnetization direction is fixed, a free layer where its magnetization direction varies according to the direction of the magnetic field to be applied, and a nonmagnetic layer that is arranged between the magnetization fixed layer and the free layer.

Figure 11:
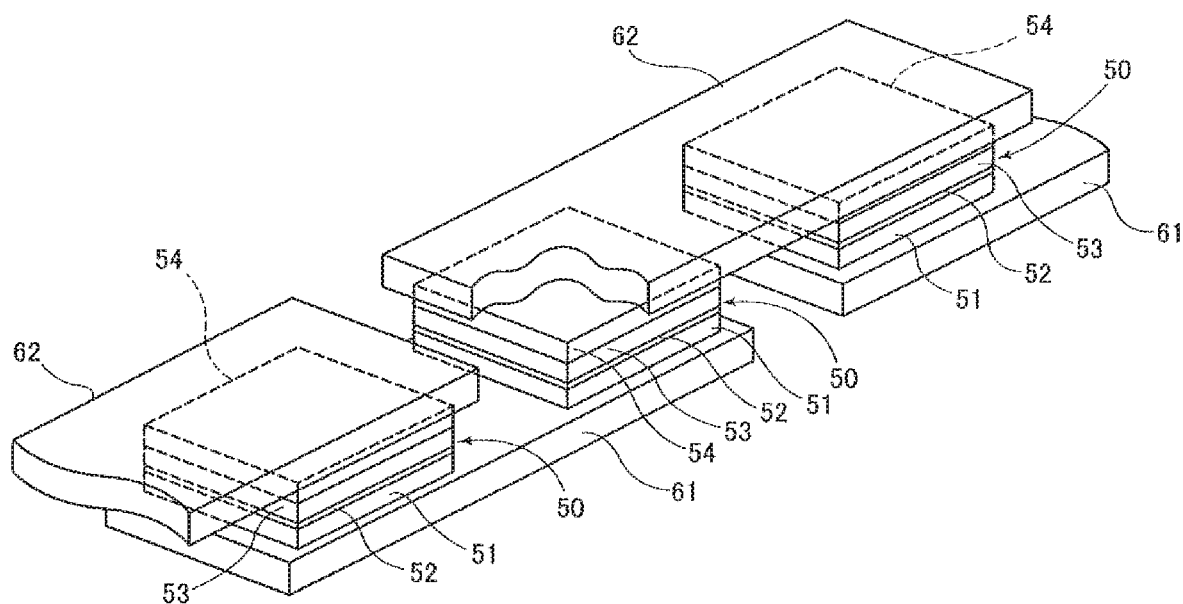
FIG. 11 is a perspective view showing a schematic configuration of MR elements as magnetic detecting elements in the embodiment of the present invention.

Specifically, as shown in FIG. 11, the TMR element and the GMR element have a plurality of lower-side electrodes 61, a plurality of MR films 50 and a plurality of upper-side electrodes 62. The plurality of lower-side electrodes 61 are placed on a substrate (not shown). Each lower-side electrode 61 has a long and narrow shape. A crevice is formed between two lower-side electrodes 61 that are adjacent in the longitudinal direction of the lower-side electrode 61. MR films 50 are placed in the vicinity of both ends in the longitudinal direction on the upper surface of the lower-side electrode 61, respectively. The MR film 50 includes a free layer 51, a nonmagnetic layer 52, a magnetization fixed layer 53 and an antiferromagnetic layer 54 laminated in respective order from the lower-side electrode 61 side. The free layer 51 is electrically connected to the lower-side electrode 61. The antiferromagnetic layer 54 is made of an antiferromagnetic material, and fulfills a role to pin the direction of magnetization of the magnetization fixed layer 53 by causing exchange coupling with the magnetization fixed layer 53. The plurality of upper-side electrode 62 is placed on the plurality of MR films 50. Each upper-side electrode 62 has a long and narrow shape, and is arranged on two lower-side electrodes 61 that are adjacent in the longitudinal direction of the lower-side electrode 61, and electrically connect the antiferromagnetic layers 54 of the two adjacent MR films 50. Furthermore, the MR films 50 may have a configuration where the free layer 51, the nonmagnetic layer 52, the magnetization fixed layer 53 and the antiferromagnetic layer 54 in respective order from the upper-side electrode 62 side.

In the TMR element, the nonmagnetic layer 52 is a tunnel bather layer. In the GMR element, the nonmagnetic layer 52 is a nonmagnetic conductive layer. In the TMR element and the GMR element, a resistance value varies according to an angle between the direction of magnetization of the free layer 51 and the direction of magnetization of the fixed layer 53, and when this angle is 0° (the magnetization directions are parallel to each other), the resistance value becomes minimal, and when it is 180° (the magnetization directions are anti-parallel with each other), the resistance value becomes maximal.

In FIG. 10A, the magnetization directions of the magnetization fixed layers in the magnetic detecting elements R11 to R14 are indicated with a solid arrow, respectively. In the first detecting circuit 31, the magnetization direction of the magnetization fixed layers 53 in the magnetic detecting elements R11 and R14 and the magnetization direction of the magnetization fixed layers 53 in the magnetic detecting elements R12 and R13 are anti-parallel with each other, and are orthogonal to the radial direction of the magnet 2.

In the first signal generating part 31A, when the magnetic field intensity $H_r$ in the radial direction is changed due to the rotation of the magnet 2, the magnetization directions of the free layers 51 in the magnetic detecting elements R11 and R12 are changed accordingly, the potential of the connecting point J11 is changed based upon a relative angle between the magnetization directions of the free layer 51 and those of the magnetization fixed layers 53. Further, similarly in the second signal generating part 31B, the potential of the connecting point J14 is changed based upon a relative angle between the magnetization directions of the free layer 51 and those of the magnetization fixed layers 53 in the magnetic detecting elements R13 and R14. Therefore, the first signal generating part 31A generates a first signal S1 corresponding to the magnetic field intensity $H_r$ in the radial direction, and the first signal S1 is output from the output port E11. The second signal generating part 31B generates a second signal S2 corresponding to the magnetic field intensity $H_r$ in the radial direction, and the second signal S2 is output from the output port E12.

Similarly, in FIG. 10B, the magnetization directions of the magnetization fixed layers in the magnetic detecting elements R21 to R24 are indicated with a solid arrow, respectively. In the second detecting circuit 32, the magnetization direction of the magnetization fixed layers 53 in the magnetic detecting elements R21 and 214 and the magnetization direction of the magnetization fixed layers 53 in the magnetic detecting elements R22 and R23 are anti-parallel with each other, but are parallel to the magnetization direction of the magnet 2.

In the third signal generating part 32A, if the magnetic field intensity $H_\theta$ in the circumferential direction is changed due to the rotation of the magnet 2, the magnetization directions of the free layers 51 of the magnetic detecting elements R21 and R22 are changed accordingly, and the potential of the connecting point J21 is changed based upon a relative angle between the magnetization direction of the free layers 51 and the magnetization direction of the magnetization fixed layers 53. Further, similarly in the fourth signal generating part 32B, the potential of the connecting point J24 is changed based upon a relative angle between the magnetization direction of the free layers 51 and the magnetization direction of the magnetization fixed layers 53 in the magnetic detecting elements R23 and R24. Therefore, the third signal generating part 32A generates a third signal S3 corresponding to the magnetic field intensity $H_\theta$ in the circumferential direction of the magnet 2, and the third signal S3 is output from the output port E21. The fourth signal generating part 32B generates a fourth signal S4 corresponding to the magnetic field intensity $H_\theta$ in the circumferential direction of the magnet 2, and the fourth signal S4 is output from the output port E22.

Figure 12:
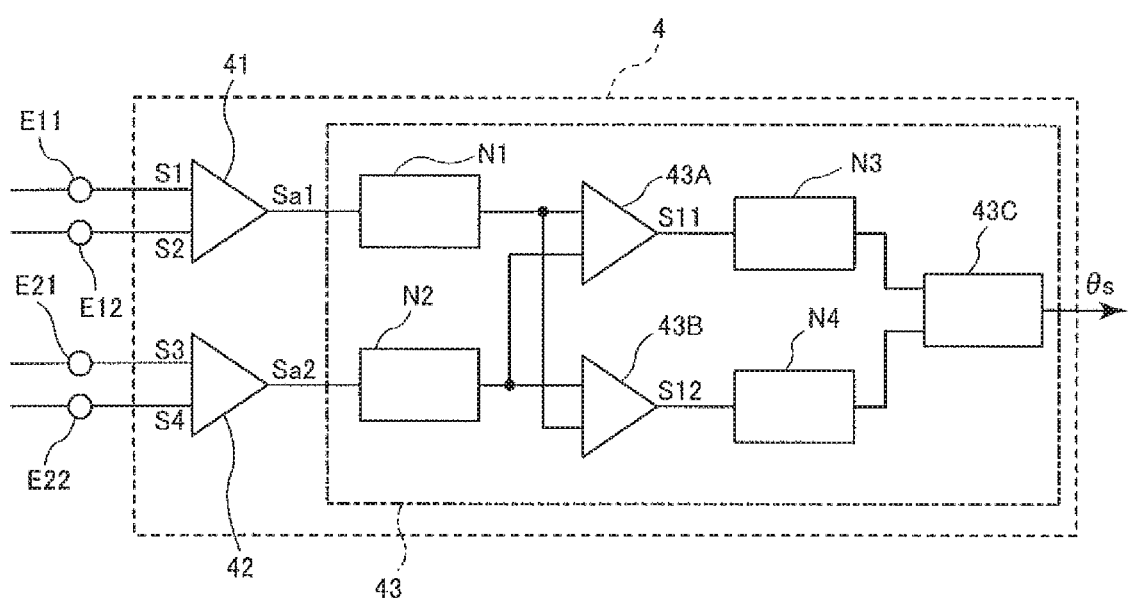
FIG. 12 is a circuit schematically showing one mode of the circuit configuration of a rotation angle detecting part in the embodiment of the present invention.

The rotation angle detecting part 4 in the present embodiment, as shown in FIG. 12, has a first arithmetic circuit 41, a second arithmetic circuit 42 and a third arithmetic circuit 43, and generates a rotation angle detection value $\theta_s$ based upon the first to fourth signals S1 to S4.

The output ports E11 and E12 are connected to two input terminals of the first arithmetic circuit 41, respectively. The output ports E21 and E22 are connected to two input terminals of the second arithmetic circuit 42, respectively. Output terminals of the first and second arithmetic circuits 41 and 42 are connected to the two input terminal of the third arithmetic circuit 43, respectively.

The first arithmetic circuit 41 generates a first post-operation signal Sa1 based upon the first and second signals S1 and S2. The second arithmetic circuit 42 generates a second post-operation signal Sa2 based upon the third and fourth signals S3 and S4. The third arithmetic circuit 43 generates a rotation angle detection value $\theta_s$ based upon the first and second post-operation signals Sa1 and Sa2.

The first post-operation signal Sa1 is generated by an operation to obtain a difference between the first signal S1 and the second signal S2 (S1-S2). The second post-operation signal Sa2 is generated by an operation to obtain a difference between the third signal S3 and the fourth signal S4 (S3-S4).

The third arithmetic circuit 43 has normalization circuits N1 to N4, an adder circuit 43A, a subtraction circuit 43B and an operation part 43C. The normalization circuits N1 to N4 have an input terminal and an output terminal, respectively. The adder circuit 43A, the subtraction circuit 43B and the operation part 43C have two input terminals and one output terminal, respectively.

An output terminal of the first arithmetic circuit 41 is connected to an input terminal of the normalization circuit N1. An output terminal of the second arithmetic circuit 42 is connected to an input terminal of the normalization circuit N2. Output terminals of the normalization circuits N1 and N2 are connected to two input terminals of the adder circuit 43A, respectively. Output terminals of the normalization circuits N1 and N2 are connected to two input terminals of the subtraction circuit 43B, respectively. An output terminal of the adder circuit 43A is connected to an input terminal of the normalization circuit N3, and an output terminal of the subtraction circuit 43B. Each output terminal of the normalization circuits N3 and N4 is connected to two input terminals of the operation part 43C.

The normalization circuit N1 outputs a value where the first post-operation signal Sa1 is normalized to the adder circuit 43A and the subtraction circuit 43B. The normalization circuit N2 outputs a value where the second post-operation signal Sa2 is normalized to the adder circuit 43A and the subtraction circuit 43B. The normalization circuits N1 and N2 normalize the first and second post-operation signals Sa1 and Sa2, for example, to adjust maximum values of the first and second post-operation signals Sa1 and Sa2 both to be 1 and to adjust minimum values both to be -1. In the present embodiment, a value where the first post-operation signal Sa1 has been normalized becomes $\sin(\theta+\pi/4)$, and a value where the second post-operation signal Sa2 has been normalized becomes $\sin(\theta-\pi/4)$. Furthermore, $\theta$ is an angle between a segment connecting the connecting points J12 and J14, and, an external magnetic field.

The adder circuit 43A performs an operation to obtain a sum of a value where the first post-operation signal Sa1 has been normalized and a value where the second post-operational signal Sa2 has been normalized, and generates an addition signal S11. The subtraction circuit 43B performs an operation to obtain a difference of a value where the first post-operation signal Sa1 has been normalized and a value where the second post-operational signal Sa2 has been normalized and generates a subtraction signal S12. The addition signal S11 and the subtraction signal S12 are expressed with the formulae below.

$$S11 = \sin(\theta - \pi/4) + \sin(\theta + \pi/4)$$
$$= 2\sin\theta \cdot \cos(-\pi/4)$$
$$= 1.41\sin\theta$$

$$S12 = \sin(\theta + \pi/4) - \sin(\theta - \pi/4)$$
$$= 2\cos\theta \cdot \sin(\pi/4)$$
$$= 1.41\cos\theta$$

The normalization circuit N3 outputs the value S21 where the addition signal S11 has been normalized to the operation part 43C. The normalization circuit N4 outputs the value S22 where the subtraction signal S12 has been normalized to the operation part 43C. The normalization circuits N3 and N4 normalize the addition signal S11 and the subtraction signal S12, for example, to adjust maximum values of the addition signal S11 and the subtraction signal S12 both to be 1, and to adjust minimum values both to be -1. In the present embodiment, the value S21 where the addition signal S11 has been normalized becomes $_{sin}$ θ, and the value S22 where the subtraction signal S12 has been normalized becomes $_{cos}$ θ.

The operation part 43C calculates a rotation angle detection value θs having a correspondence relationship with the angle θ based upon the values S21 and S22. For example, the operation part 43C calculates the rotation angle detection value $θ_s$ using the formula below.

$$θ_s=\arctan(S21/S22)$$

When the rotation angle detection value $θ_s$ is within the range 0° or greater but less than 360°, there are two different values by 180° in solutions of the rotation angle detection value $θ_s$. However, the true value of the rotation angle detection value $θ_s$ can be determined to be either one of the two solutions according to a combination of positive and negative of the values S21 and S22. In other words, when the value S21 is a positive value, the rotation angle detection value $θ_s$ is greater than 0° but smaller than 180°. When the value S21 is a negative value, the rotation angle detection value $θ_s$ is greater than 180° but smaller than 360°. When the value S22 is a positive value, the rotation angle detection value $θ_s$ is within a range of 0° or greater but less than 90° and greater than 270° and 360° or less. When the value S22 is a negative value, the rotation angle detection value $θ_s$ is greater than 90° but smaller than 270°. The operation part 43C can acquire a true value for the rotation angle detection value $θ_s$ within the range of 0° or greater but less than 360° according to a combination of the positive and negative of the values S21 and S22.

As described above, in the rotation angle sensing device 1 relating to the present embodiment, because the magnet 2 has the base portion 21 having the second surface 2B, and, the convex portion 22 that has the first surface 2A and protrudes toward the first surface 2A side from the base portion 21, a region (magnetic sensor arrangeable region 5) where the amplitudes of the magnetic field intensities $H_r$ and $H_θ$ in the radial direction and the circumferential direction is created beneath the second surface 2B. Then, since the magnetic sensor part 3 is placed in this magnetic sensor arrangeable region 5, a detection error of the rotation angle can be reduced. Further, since it is configured to calculate a rotation angle according to the magnetic field intensity a in the radial direction and the magnetic field intensity $H_θ$ in the circumferential direction and the magnetic sensor arrangeable region 5 is sufficiently larger than the magnetic sensor parts 3, generation of a detection error of the rotation angle due to deviation of the shaft S can be suppressed. In addition, the magnet 2 has the base portion 21 having the second surface 2B, and, the convex portion 22 that has the first surface 2A and protrudes toward the first surface 2A side from the base portion 21, and because the rotation angle detection value $θ_s$ can be calculated according to the magnetic field intensity $H_r$ in the radial direction and the magnetic field intensity $H_θ$ in the circumferential direction, it becomes possible to reduce the volume of the magnet 2.

The embodiment explained above was described to facilitate the understanding of the present invention, but not described to restrict the present invention. Therefore, each element disclosed in the embodiment is a concept including all design around and equivalents belonging to the technical scope of the present invention.

For example, in the embodiment, the magnetic sensor part 3 may detect either one of the magnetic field intensity $H_r$ in the radial direction and the magnetic field intensity $H_{rθ}$ in the circumferential direction, and, the magnetic field intensity $H_z$ in the direction along the rotation axis C of the shaft S, and the rotation angle detection value $θ_s$ can be calculated by the rotation angle detecting part 4 based upon either one of the magnetic field intensity $H_r$ in the radial direction and the magnetic field intensity $H_r$ in the circumferential direction, and, the magnetic field intensity $H_z$, in a direction along the rotation axis C of the shaft S.

EXAMPLE

Hereafter, the present invention will be explained in further detail with reference to examples and the like, but the present invention shall not limited to the examples below.

Example 1

Figure 13:
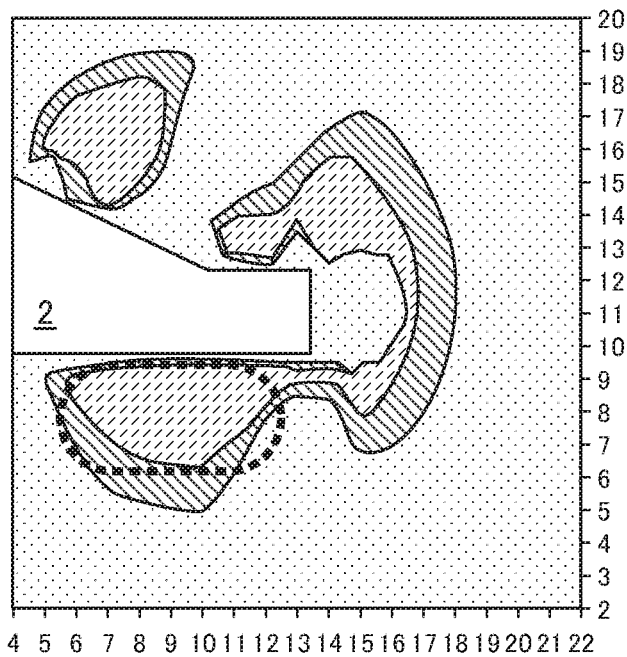
FIG. 13 shows a simulation result of Example 1.

In the magnet having the configuration shown in FIG. 1 and FIG. 2, a magnetic field distribution of the magnet 2 and an angle error distribution based upon it were obtained by simulation using a finite element method (FEM). Furthermore, the thickness $T_{21}$ of the base portion 21 of the magnet 2 was set to 2.25 mm; the thickness $T_{22}$ of the convex portion 22 was set to 2.75 mm; the length L from the side surface 2C to a rising position P was set to 2.0 mm; the diameter $D_{2A}$ of the first surface 2A was set to 12 mm; the diameter $D_{2B}$ of the second surface 2B was set to 28 mm; the inclination angle $θ_{2D}$ of the inclined side surface 2D was set to 25°; and the volume was set to 1.86 cm³ (volume ratio of the base portion 21 to the convex portion 22 $(V_{21}:V_{22})=1:0.46$). The results are shown in FIG. 13.

Example 2

Figure 14:
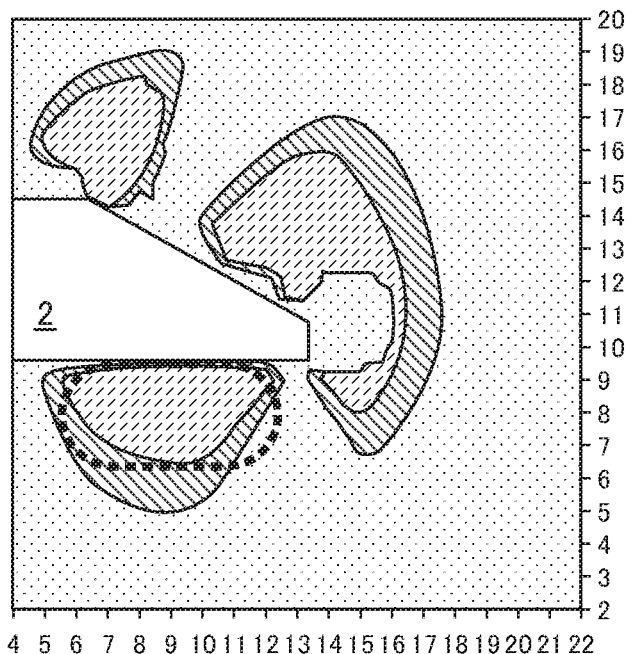
FIG. 14 shows a simulation result of Example 2.

As similar to Example 1 except for using the magnet 2 having the configuration shown in FIG. 3, the magnetic field distribution of the magnet 2 and the angle error distribution were obtained by simulation. Furthermore, the thickness $T_{21}$ of the base portion 21 of the magnet 2 was set to 1.1 mm; the thickness $T_{22}$ of the convex portion 22 was set to 3.9 mm; the diameter $D_{2A}$ of the first surface 2A was set to 14.4 mm; the diameter $D_{2B}$ of the second surface 2B was set to 28 mm; the inclination angle $θ_{2D}$ of the inclined side surface 2D was set to 30°; and the volume was set to 1.75 cm³ (volume ratio of the base portion 21 to the convex portion 22 $(V_{21}:V_{22})=1:1.75$). The results are shown in FIG. 14.

Example 3

Figure 15:
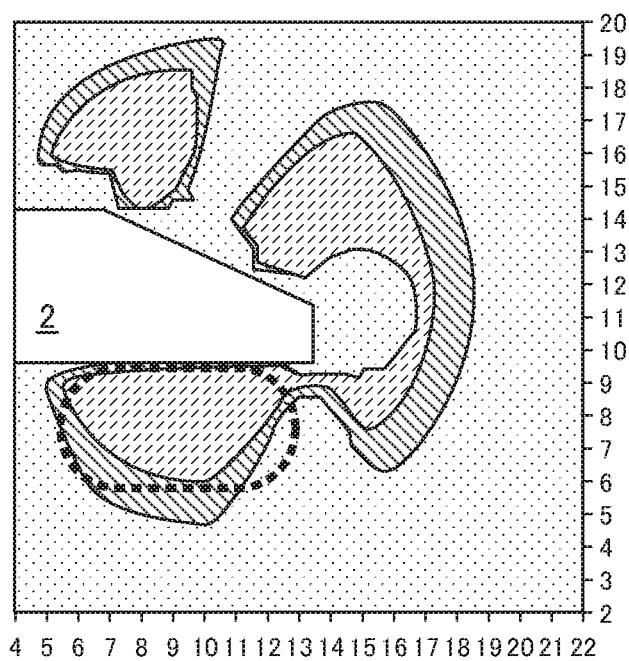
FIG. 15 shows a simulation result of Example 3.

As similar to Example 2 except for setting the thickness $T_{21}$ of the base portion 21 of the magnet 2 to 1.8 mm; the thickness $T_{22}$ of the convex portion 22 to 3.2 mm; the volume to 2.08 cm³ (volume ratio of the base portion 21 to the convex portion 22 $(V_{21}:V_{22})=1:0.95$), the magnetic field distribution of the magnet 2 and the angle error distribution were obtained by simulation. The results are shown in FIG. 15.

Example 4

Figure 16:
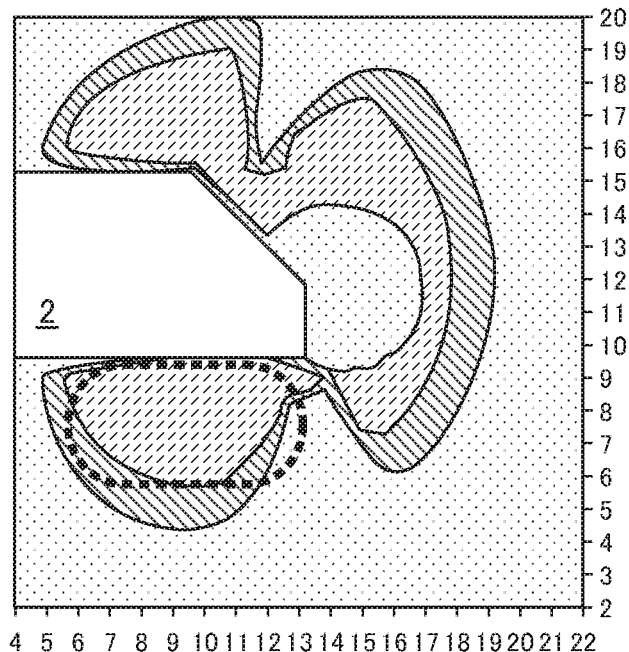
FIG. 16 shows a simulation result of Example 4.

As similar to Example 3 except for setting the inclined angle $θ_{2D}$ of the inclined side surface 2D of the magnet 2 to 45°; and the volume was set to 2.41 cm³ (volume ratio of the base portion 21 to the convex portion 22 $(V_{21}:V_{22})=1:1.44$), the magnetic field distribution of the magnet 2 and the angle error distribution were obtained by simulation. The results are shown in FIG. 16.

Example 5

Figure 17:
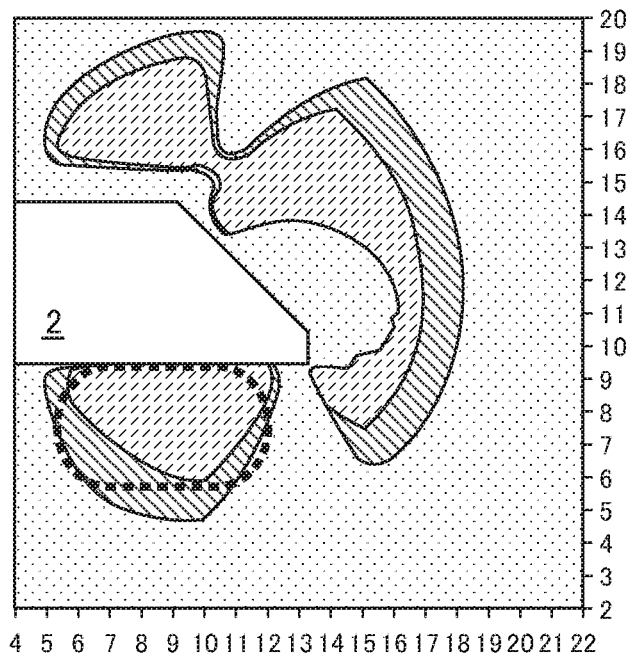
FIG. 17 shows a simulation result of Example 5.

As similar to Example 4 except for setting the thickness $T_{21}$ of the base portion 21 of the magnet 2 to 0.6 mm; the thickness $T_{22}$ of the convex portion 22 to 4.4 mm; and the volume to 2.04 cm³ (volume ratio of the base portion 21 to the convex portion 22 ($V_{21}$:$V_{22}$)=1:6.24), the magnetic field distribution of the magnet 2 and the angle error distribution were obtained by the simulation. The results are shown in FIG. 17.

Example 6

Figure 18:
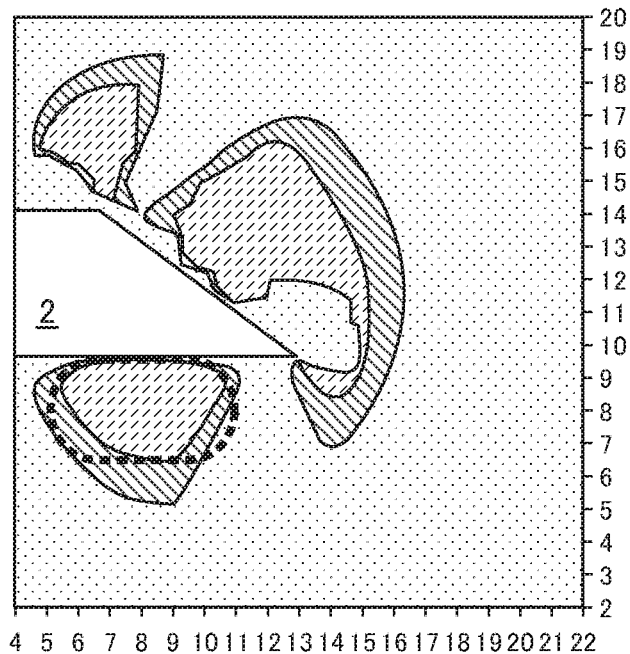
FIG. 18 shows a simulation result of Example 6.

As similar to Example 1 except for using the magnet having the configuration shown in FIG. 4, the magnetic field distribution of the magnet 2 and the angle error distribution were obtained by simulation. Furthermore, the thickness of the magnet 2 (the thickness $T_{22}$ of the convex portion 22) was set to 5 mm; the diameter $D_{2A}$ of the first surface 2A was set to 12 mm; the diameter $D_{2B}$ of the second surface 2B was set to 28 mm; the inclination angle $\theta_{2D}$ of the inclined side surface 2D was set to 32°; and the volume was set to 14.03 cm³. The results is are shown in FIG. 18.

Example 7

Figure 19:
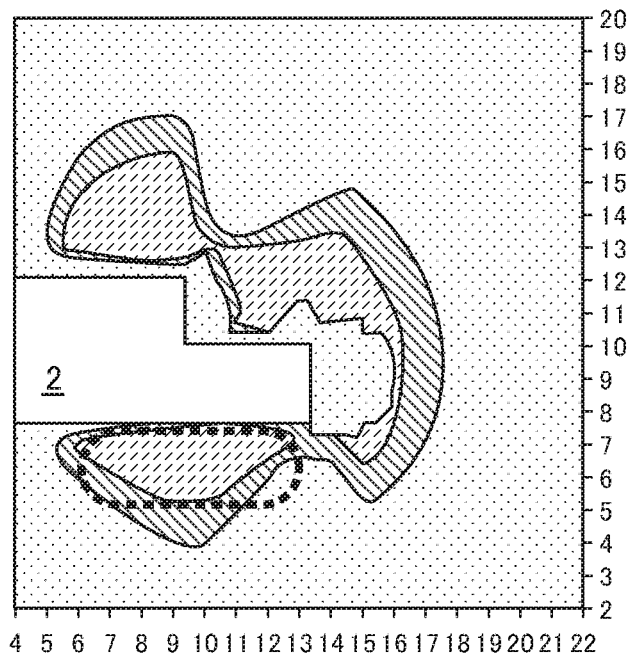
FIG. 19 shows a simulation result of Example 7.

As similar to Example 1 except for using the magnet 2 having the configuration shown in FIG. 5, the magnetic field distribution of the magnet 2 and the angle error distribution were obtained by simulation. Furthermore, the thickness $T_{21}$ of the base portion 21 of the magnet 2 was set to 2.0 mm; the thickness $T_{22}$ of the convex portion 22 was set to 2.0 mm; the length from the side surface 2C to the rising position P in the radial direction to 4 mm; the diameter $D_{2A}$ of the first surface 2A was set to 20 mm; the diameter $D_{2B}$ of the second 2B was set to 28 mm; and the volume to 1.66 cm³ (volume ratio of the base portion 21 to the convex portion 22 ($V_{21}$:$V_{22}$)=1:0.47). The results are shown in FIG. 19.

Example 8

Figure 20:
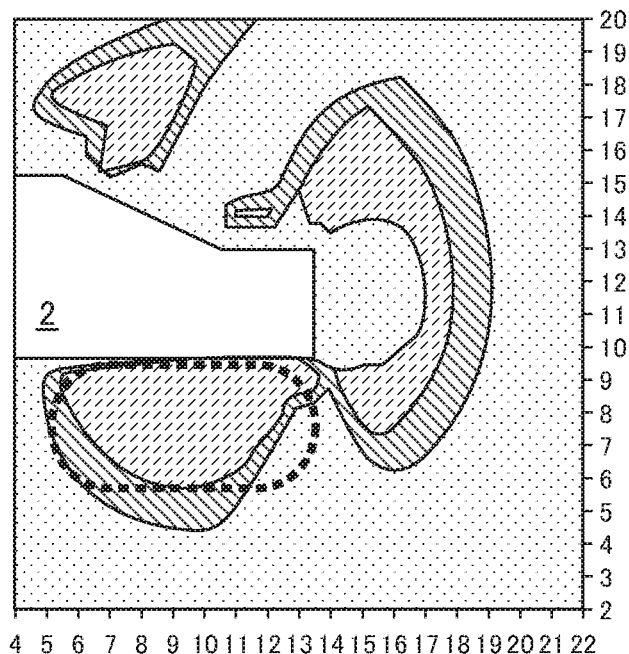
FIG. 20 shows a simulation result of Example 8.

As similar to Example 1 except for setting the thickness $T_{21}$ of the base portion 21 of the magnet 2 to 3.25 mm; the volume to 2.45 cm³ (volume ratio of the base portion 21 to the convex portion 22 ($V_{21}$:$V_{22}$)=1:0.32), the magnetic field distribution of the magnet 2 and the angle error distribution were obtained by simulation. The results are shown in FIG. 20.

Example 9

Figure 21:
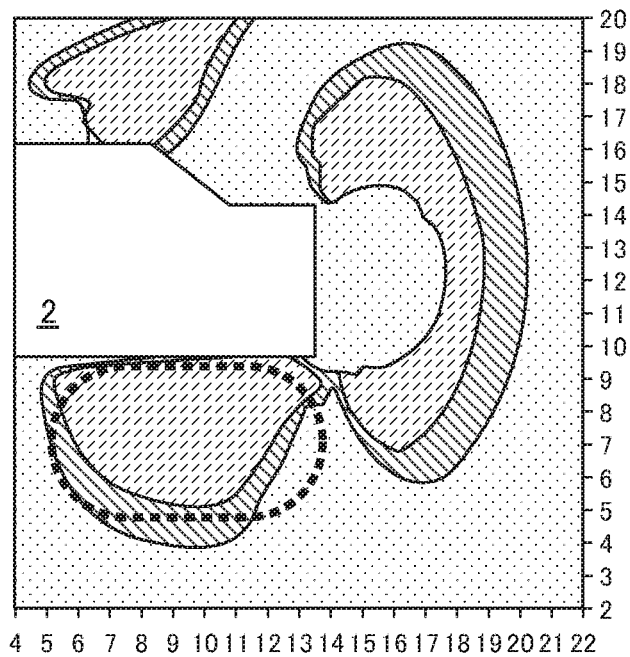
FIG. 21 shows a simulation result of Example 9.

As similar to Example 1 except for setting the thickness $T_{21}$ of the base portion 21 of the magnet 2 to 4.25 mm; and the volume to 2.99 cm³ (volume ratio of the base portion 21 to the convex portion 22 ($V_{21}$:$V_{22}$)=1:0.24), the magnetic field distribution of the magnet 2 and the angle error distribution were obtained by simulation. The results are shown in FIG. 21.

Comparative Example 1

Figure 22:
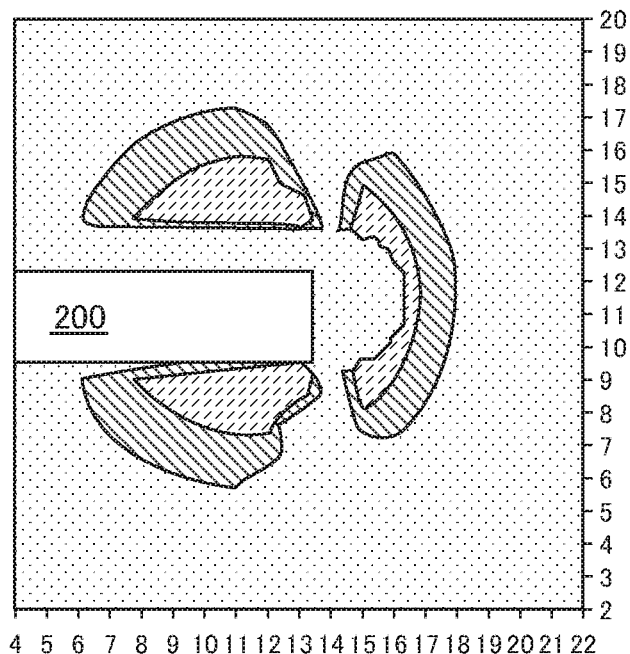
FIG. 22 shows a simulation result of Comparative Example 1.
Figure 23A:
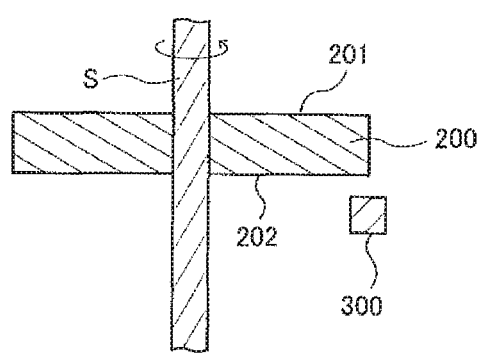
FIG. 23A is a cross-sectional view (Part 1) showing a schematic configuration of a conventional rotation angle sensing device.
Figure 23B:
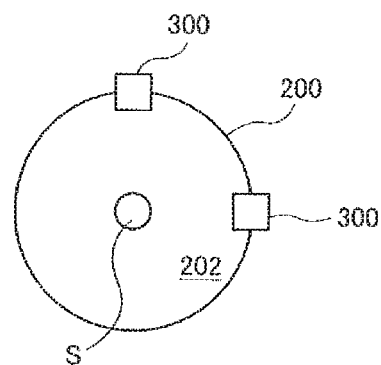
FIG. 23B is a plan view (Part 1) viewing from a second surface side of a magnet in the conventional rotation angle sensing device.
Figure 24A:
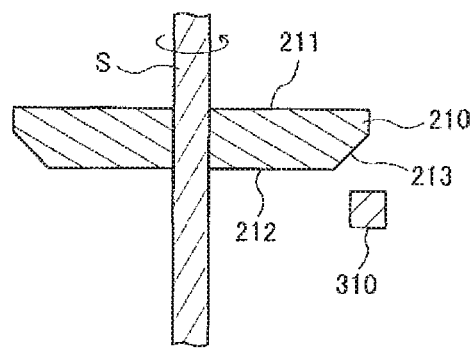
FIG. 24A is a cross-sectional view (Part 2) showing a schematic configuration of a conventional rotation angle sensing device.
Figure 24B:
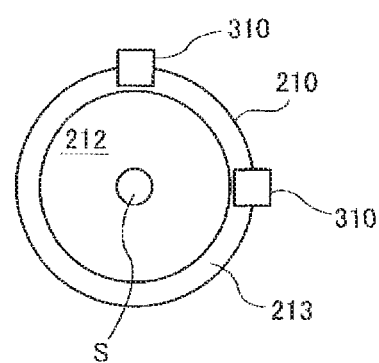
FIG. 24B is a plan view (Part 2) viewing from a second surface side of a magnet in the conventional rotation angle sensing device.

As similar to Example 1 except for using the magnet 200 having the configuration shown in FIGS. 23A and 23B, the magnetic field distribution of the magnet 200 and the angle error distribution were obtained by simulation. Furthermore, thickness of the magnet 200 was set to 3 mm; the diameter was set to 28 mm; and the volume was set to 16.96 cm³. The results are shown in FIG. 22.

FIGS. 13 to 22 show the angle error distribution in the vicinity of the outer circumference part of the magnets 2 and 200 obtained by simulations of Examples 1 to 9 and Comparative Example 1, respectively. In FIGS. 13 to 22, regions where their brightness is the lowest around the circumference of the magnets 2 and 200 (regions with hatching of dots) are regions where the magnetic field intensities $H_r$ and $H_\theta$ in the radial direction and the circumferential direction are less than 15 mT; regions where their brightness is the highest (regions with hatching of dashed lines) are regions where the magnetic field intensities $H_r$ and $H_\theta$ in the radial direction and the circumferential direction are 20 mT or greater; and regions where their brightness is intermediate (regions with hatching of continuous lines) are regions where the magnetic field intensities $H_r$ and $H_\theta$ in the radial direction and the circumferential direction are 15 mT or greater but less than 20 mT. Regions surrounded with a broken line are regions where an angle error is improved; regions having magnetic field intensities that are detectable by the magnetic sensor part or parts 3 (magnetic field intensities $H_r$ and $H_\theta$=20 to 80 mT); and regions that can be the magnetic sensor arrangeable region.

According to the results shown in FIGS. 13 to 22, in Examples 1 to 9, it was determined that the rotation angle would be accurately detectable based upon the magnetic field intensities $H_r$ and $H_\theta$ in the radial direction and/or the circumferential direction at a predetermined position on a circular virtual plane Vf. Further, according to the results shown in FIGS. 14 to 16, it was determined that a position of the region where the rotation angle would be accurately detectable (magnetic sensor arrangeable region 5) would not fluctuate even if the inclination angle of the inclined side surface 2C was changed. In addition, according to the results shown in FIGS. 13 to 11, in Examples 1 to 9, it t was determined hat a position of the region where the rotation angle would be accurately detectable (magnetic sensor arrangeable region 5) would not fluctuate regardless of the shape or the like of the magnet 2. Further, according to the results shown in FIGS. 13 to 21, it was determined that a detection error of the rotation angle could be reduced because the convex portion 22 of the magnet 2 protrudes toward the first surface 2A from a position internally in the radial direction from the side surface 2C. In addition, according to the results shown in FIGS. 13, 20 and 21, it was determined that the size of the magnetic sensor arrangeable region 5 would increase as the volume ratio of the base portion 21 in the magnet 2 increases.

DESCRIPTION OF SYMBOLS

1 . . . rotation angle sensing device
2 . . . magnet
2A . . . first surface
2B . . . second surface
3 . . . magnetic sensor part
4 . . . rotation angle sensing part

What is claimed is:
1. A rotation angle sensing device, comprising:
   a magnet that is placed to be rotatable integrally with a rotary shaft of a rotating body in association with a rotation of the rotating body, and where a shape of the magnet as viewed along a rotation axis of the rotary shaft is substantially circular;
   at least one magnetic sensor part that outputs at least one sensor signal based upon a change in a direction of a magnetic field in association with the rotation of the magnet; and a rotation angle sensing part that detects a rotation angle of the rotating body based upon the sensor signal output by the magnetic sensor part, wherein the magnet comprises a first surface, a second surface, a side surface, a third surface and an inclined surface, the first surface is substantially orthogonal to the rotation axis, the second surface is on an opposite side of the magnet from the first surface, the side surface extends from an outer circumference part of the second surface to an outer circumference part of the third surface and is substantially parallel to the rotation axis of the rotary shaft, the third surface extends from an end portion of the side surface to an end portion of the inclined surface, is positioned between the first surface and the second surface along the rotation axis of the rotary shaft, and is located on an opposite side of the magnet from the second surface, the inclined surface extends between an outer circumference part of the first surface and an end portion of the third surface and is inclined between the first and second surfaces at a predetermined angle;

the magnet has a base portion, which has the second surface, the side surface and the third surface, and a convex portion, which has the first surface and the inclined surface, wherein the convex portion protrudes from the base portion;

a size of the first surface is smaller than a size of the second surface;

when the first surface of the magnet is positioned on an upper side of the magnet and the second surface of the magnet is positioned on a lower side of the magnet, the magnetic sensor part is placed under the second surface of the magnet;

the magnet comprises a magnetization vector component in a direction that is orthogonal to the rotation axis; and when a circular virtual plane that is orthogonal to rotation axis and centered upon the rotation axis is set in a vicinity of the magnet, the magnetic sensor part is placed at a position where amplitudes of a magnetic field intensity $H_r$ in a radial direction of the magnet and a magnetic field intensity $H_\theta$ in a circumferential direction of the magnet on the virtual plane are substantially the same, and at least one of the magnetic field intensity $H_r$ in the radial direction and the magnetic field intensity $H_\theta$ in the circumferential direction is output as the sensor signal.

2. The rotation angle sensing device according to claim 1, wherein the magnetic sensor part is placed between a first line that is parallel to the rotation axis and passes through the outer circumference part of the first surface and a second line that is parallel to the rotation axis and passes through the outer circumference part of the second surface.

3. The rotation angle sensing device according to claim 1, wherein a volume ratio of the base portion to the convex portion is 1:0.2 or greater.

4. The rotation angle sensing device according to claim 1, wherein the magnet sensor part consists of a TMR element, a GMR element, an AMR element or a Hall element.

5. The rotation angle sensing device according to claim 1, comprising:

the at least one magnetic sensor part including a plurality of magnetic sensor parts, wherein at least two of the plurality of the magnetic sensor parts are arranged substantially at intervals of (180/M°) about the rotation axis, where M is an integer greater than or equal to 2.

6. The rotation angle sensing device according to claim 5, wherein the at least one sensor signal includes a plurality of sensor signals, and wherein each of the plurality of magnetic sensor parts includes sensor outputs that include the magnetic field intensity $H_r$ in the radial direction or the magnetic field intensity $H_\theta$ in the circumferential direction as a respective one of the plurality of the sensor signals.

* * * * *